Jan. 24, 1928.
W. C. TRACY
1,657,097
APPARATUS FOR THE RECOVERY OF MINERALS FROM ORE
Filed Aug. 3, 1925
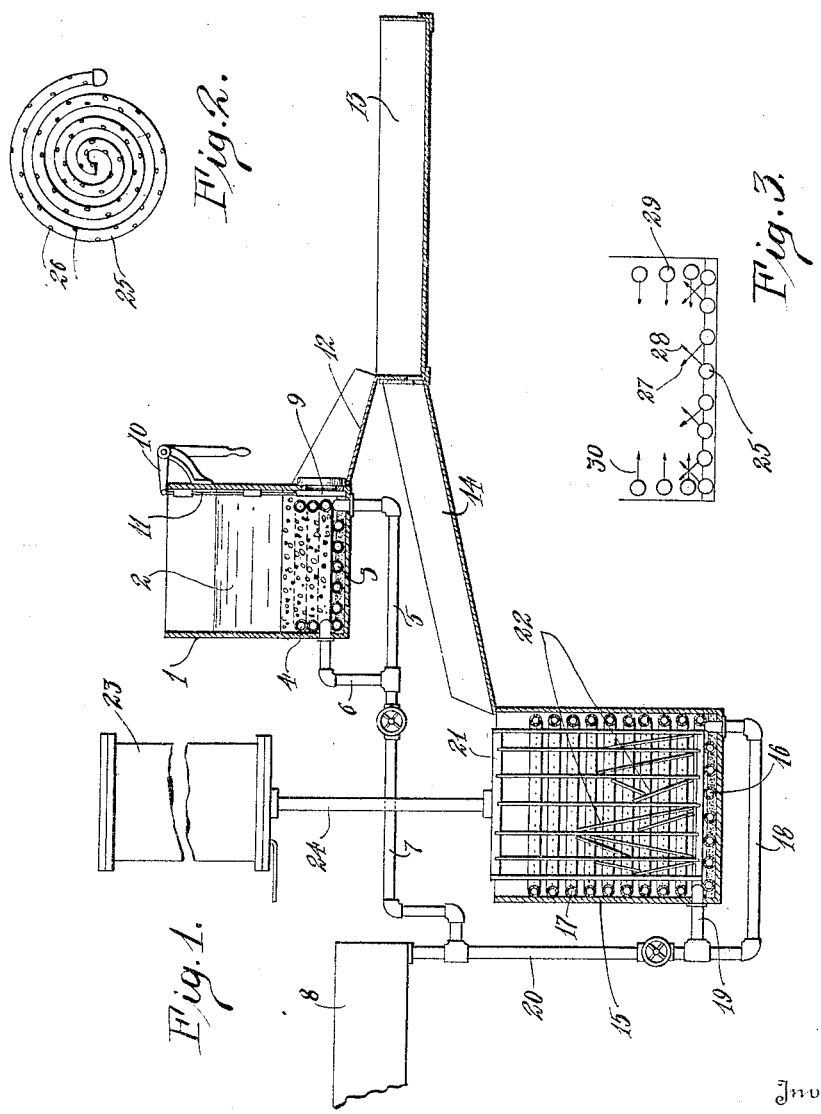
Inventor
Warren C. Tracy.
By Lyon & Lyon
Attorneys Patented Jan. 24, 1928.

1,657,097

UNITED STATES PATENT OFFICE.

WARREN C. TRACY, OF LOS ANGELES, CALIFORNIA.

APPARATUS FOR THE RECOVERY OF MINERALS FROM ORE.

Application filed August 3, 1925. Serial No. 47,668.

This invention relates to ore treating apparatus for the recovery of valuable metals from native ores. Many attempts have heretofore been made to provide a system or apparatus for the continuous leaching and precipitating of valuable ores, such as copper and the like, from native ores, such as sulphides, carbonates, oxides, and the like, which attempts, however, have, for the most part, been an expensive operation and of inefficient recovery.

It is, therefore, an object of this invention to provide an apparatus for the leaching and precipitating of copper from native ores in which the entire leaching and precipitating operation is performed in the cold state and in which the entire leaching and precipitating operation is performed in approximately ten minutes.

Another object of this invention is to provide an apparatus for the leaching and precipitating of copper metal from native ores, in which means are provided for leaching and precipitating the copper from the native ores in a minimum of time, employing a plurality of oppositely directed jets of air for the oxidation and circulation and driving of the copper into the leaching solution and from such leaching solution against suitable precipitating members.

Other objects and advantages of this invention will be apparent from the following detailed description of a preferred embodiment thereof, as illustrated in the accompanying drawings:

In the drawings:

Fig. 1 is a side elevation of an apparatus embodying this invention, illustrating the leaching and precipitating tanks in central sectional side elevation.

Fig. 2 is a top plan view of the air circulating coils removed from the leaching or precipitating tank.

Fig. 3 is a diagrammatic view illustrating the direction of flow of the air current within the leaching and precipitating pans.

In the preferred embodiment of this invention illustrated in the accompanying drawings, 1 shows a leaching tank in which a solution 2 is held and in which leaching tank 1 there are two separate coils 3 and 4, which coils 3 and 4 are connected through conduits 5 and 6, respectively, through a conduit 7 to a source 8 of compressed air. Finely ground ore is played into the leaching tank 1 and is leached therein by a leaching solution, aided by the oxidizing action of the air circulated through such solution from the coils 3 and 4 as will hereinafter appear.

When the ore is leached a gate 9 is lifted by means of a lever 10 which is connected to the gate 9 through a series of links 11 so that the leaching solution 2 flows from the leaching tank 1 down a trough 12 into a precipitating chamber or tank 13 which is open at its upper end to the air. Leaving the precipitating tank 13, from which tank 13 the unleached portions of the ore are separated from the leaching solution, the leaching solution travels through a trough 14 into the precipitating tank 15 in which precipitating tank 15 there are a pair of coils 16 and 17 similar to the coils 3 and 4, which coils 16 and 17 are conducted through conduits 18 and 19, respectively, to a conduit 20 which connects to the source of compressed air 8.

Mounted in the leaching tank 15 is a basket of frame work 21 in which scrap iron 22 is supported on its edge so as to present a large precipitating surface to the action of the leaching solution to precipitate the copper therefrom. The basket 21 is connected to a hydraulic cylinder 23 through a connecting rod 24 so that the same may be easily elevated from within the tank 15.

I have discovered that if I employ in a leaching tank coils 25 similar to the coils 3 and 16 that the copper will be releached from the ore in a minimum of time. In the coils there are a plurality of alternately diverging perforations 26 which cause the air circulated through such coil 25 to travel in the direction of the arrows 27 and 28 illustrated in Fig. 3 so that the air currents from the separate perforations 26 of the coil cross at a short distance above the turns of the coil and a coil 29, similar to the coils 4 and 17, is coiled around the inner periphery of the leaching tank 1 or the precipitating tank 15 and which coil 29 has a plurality of perforations adapted to divert or permit the injection of air circulated therethrough into the leaching or precipitating tanks in the direction of the arrows 30 so that the direction of the inflow of the air from the coil 29 is directly opposed to the direction of flow of the air from the perforations 26 of the coil 25. With this plurality of oppositely traveled air currents, I have discovered that I am enabled to leach and precipitate copper from even a sulphide ore in the very short space of time of ten minutes.

Having fully described a preferred embodiment of my invention, it is to be understood that I do not wish to be limited to the exact details herein set forth which may, obviously, be varied in detail without departing from the spirit of the invention as set forth in the appended claim.

I claim:

In a tank for the recovery of copper from its ores, a flat horizontal coil mounted on the bottom of the said tank and having a plurality of oppositely diverging perforations formed therein, a helical coil coiled around the inner periphery of the said tank and having a plurality of perforations formed therein for emitting air currents transversely across the tank, and means for supplying air under pressure to the said coils.

Signed at Los Angeles, California, this 22d day of July, 1925.

WARREN C. TRACY.